United States Patent [19]

Haub et al.

[11] 4,378,855

[45] * Apr. 5, 1983

[54] MULTI-SPEED DRIVE WITH FORWARD/REVERSE LOCKOUT

[75] Inventors: Donald J. Haub, Champlin; Neil T. Brown, Minneapolis; Keith N. Krier, Tonka Bay; Raymond C. Hawkins, Minneapolis; Howard N. Seim, Columbia Heights, all of Minn.

[73] Assignee: Tennant Company, Minneapolis, Minn.

[*] Notice: The portion of the term of this patent subsequent to Dec. 21, 1999, has been disclaimed.

[21] Appl. No.: 68,160

[22] Filed: Aug. 20, 1979

[51] Int. Cl.³ .............................................. B60K 1/02
[52] U.S. Cl. .................................. 180/65 R; 15/389; 318/284
[58] Field of Search ............... 180/65 R, 65 F, 272, 180/271; 318/263, 273, 283, 284; 15/314, 389

[56] References Cited

U.S. PATENT DOCUMENTS

| | | | |
|---|---|---|---|
| 1,464,031 | 8/1923 | Daly | 15/302 |
| 2,378,785 | 6/1945 | Ogden | 318/284 |
| 2,394,111 | 2/1946 | Schaelchlin | 318/263 |
| 2,494,611 | 1/1950 | Eisenborg | 318/284 |
| 2,510,028 | 5/1950 | Ulinski | 318/263 |
| 2,817,802 | 12/1957 | Roggenkamp | 318/284 |
| 2,990,506 | 6/1961 | Montross | 318/284 |
| 3,179,198 | 4/1965 | Hastings | 180/65 R |
| 3,204,280 | 9/1965 | Campbell | 15/314 |
| 3,293,678 | 12/1966 | South | 15/29 |
| 3,332,507 | 7/1967 | Bush | 318/284 |
| 3,381,335 | 5/1968 | Schaedlich et al. | 15/313 |
| 3,436,632 | 4/1969 | Tisserant et al. | 318/284 |
| 3,646,630 | 3/1972 | Russell | 15/302 |
| 3,869,749 | 3/1975 | London et al. | 15/302 |
| 3,875,463 | 4/1975 | Reuter et al. | 317/13 R |
| 3,884,318 | 5/1975 | Abels et al. | 180/65 R |
| 3,923,116 | 12/1975 | Thompson et al. | 180/65 R |

Primary Examiner—David M. Mitchell
Attorney, Agent, or Firm—Merchant, Gould, Smith, Edell, Welter & Schmidt

[57] ABSTRACT

An improvement for electrically driven floor maintenance apparatus including means for varying the speed of the driving motors is disclosed. Two speed ranges are provided by switching means which change the interconnection of the drive motors from series for the low speed range, and parallel for the high speed range. Within each speed range, intermediate speeds are provided by placing resistors with shunt in series with the motors. Time delay circuitry is also included to prevent immediate operation of the vehicle in the high speed of each range until the vehicle has had some time to accelerate. Additionally, means are provided for detecting whether a vehicle is rolling in a forward or reverse direction and circuits are provided to prevent the operator from driving the vehicle in an opposite direction until the vehicle has slowed down to a near stop. A deadman control is provided to prevent the energizing of the drive motors when the operator is no longer seated on the driver's seat. ///

11 Claims, 4 Drawing Figures

MULTI-SPEED DRIVE WITH FORWARD/REVERSE LOCKOUT

TECHNICAL FIELD

The present invention relates to certain improvements in switching and power control circuitry on electrically driven floor maintenance vehicles.

A wide variety of machines are available for use in maintenance of surfaces such as floors, parking lots and streets. These maintenance machines generally include sweeping machines and scrubbing machines. The present invention may be utilized on any such equipment for purposes of varying the speed of such equipment. The present invention provides increased safety and motor life through apparatus which delay or prevent immediate energizing of the motor in its higher speed. The present circuitry also prevents jolting action caused when the motors are suddenly energized in a direction opposite to that which they are already operating.

BACKGROUND OF PRIOR ART

Historically, electrically driven floor maintenance vehicles have used resistors for varying speed. Such technique, however, results in an inefficient use of power and may prevent the motors from operating at their highest efficiency.

BRIEF SUMMARY OF THE INVENTION

The present apparatus is designed for use in electrically driven floor maintenance equipment having battery powered reversable drive motors. The vehicle may utilize two drive motors for propulsion. In the low speed, resistors are provided in series with the batteries and the motors and the motors are connected in series with each other. In order to increase from the low speed to the next higher speed, relay contacts provide a shunt around a portion of the resistance and permit greater current to flow to the motors. By successively shunting more resistance, current increases which causes the speed of the motors to be increased. A time delay may be provided to prevent the operator from energizing the motors at their higher speed with all resistors shunted until a certain minimum time interval has elapsed.

In order to increase the speed still further, relay contacts change the series arrangement of the two drive motors to a parallel arrangement thus increasing the voltage applied to the motors. When the motors are in the parallel configuration, intermediate speeds may likewise be provided by successively shunting the aforementioned series resistors.

In order to prevent a vehicle from jolting when the operator attempts to reverse the direction of the moving vehicle, circuitry is provided for detecting the direction in which the vehicle is rolling and preventing the reversal of the motors until the vehicle is nearly stopped or has reached some other predetermined speed.

DETAILED DESCRIPTION OF THE INVENTION

Figure 1:
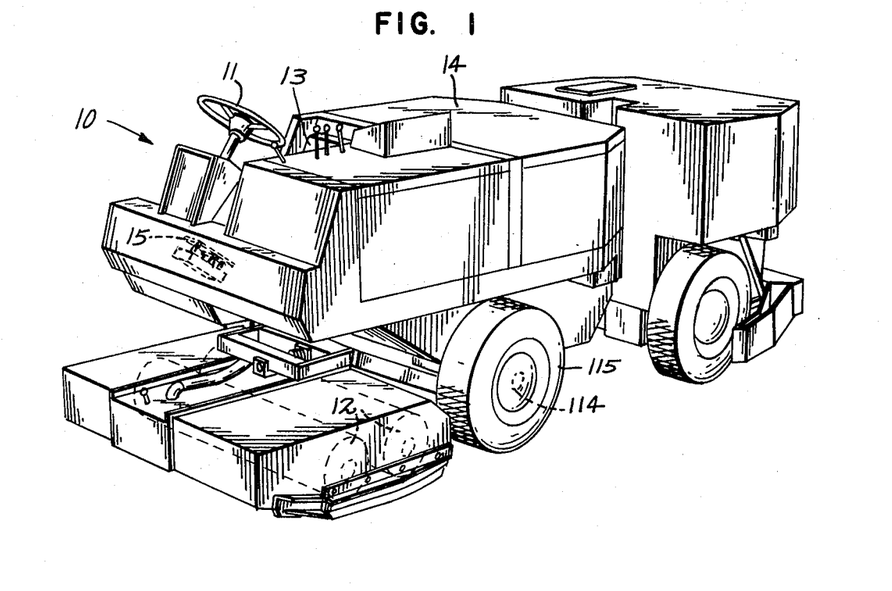
FIG. 1 is a perspective view of an electrically driven floor maintenance vehicle.

A riding type floor scrubber 10 is disclosed in FIG. 1 having one of its drive wheels 115 and drive shaft 114 visible. Scrubber brushes 12 are attached to the front section of the vehicle. Storage batteries are located in compartment 14. Scrubber 10 has an operator's seat 13 and steering wheel 11. Foot control 15 is provided as a combined forward/reverse and speed range control.

Figure 2:
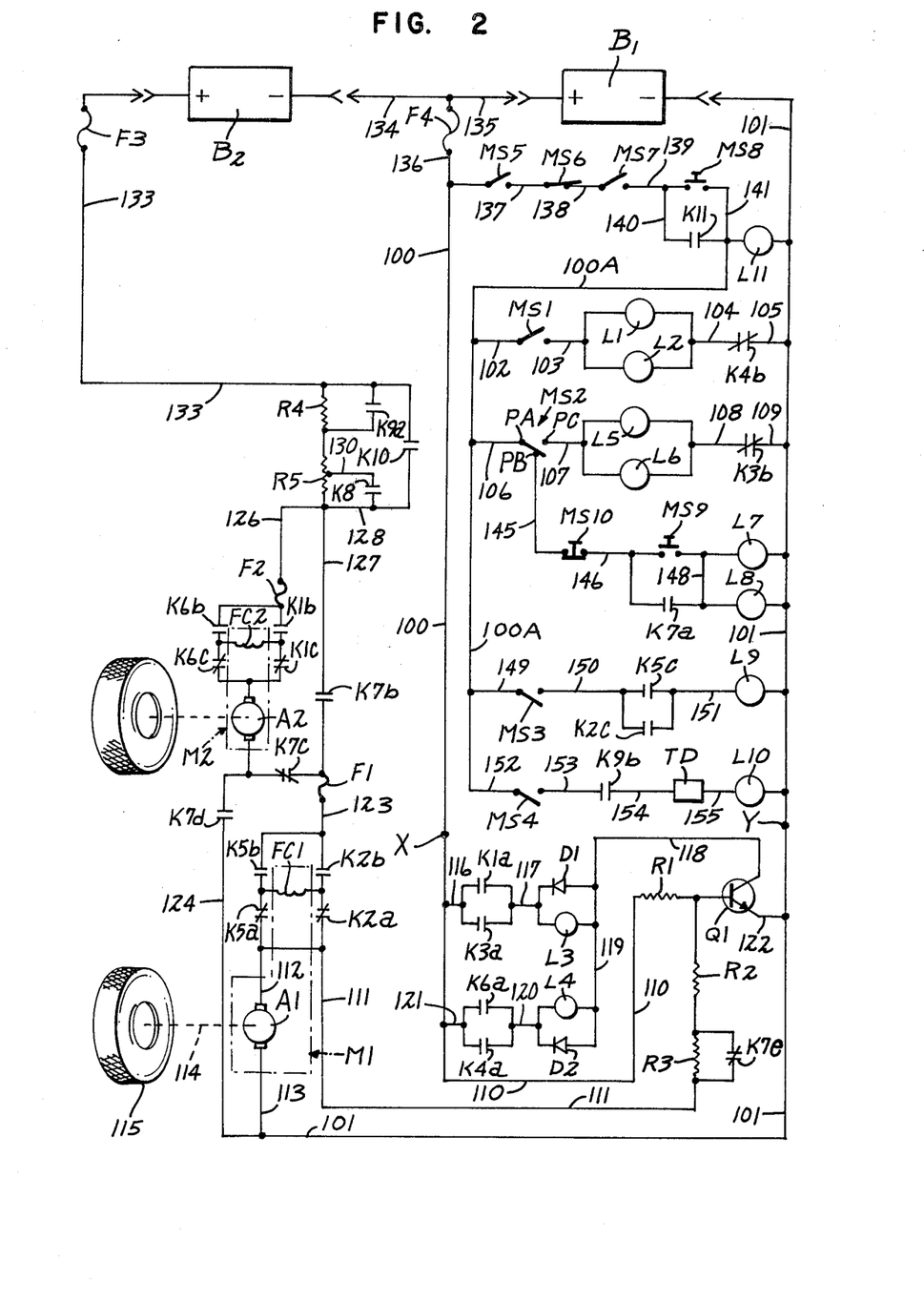
FIG. 2 is a schematic circuit of one preferred embodiment of the improved control circuitry.

Electrical circuitry for scrubber 10 is illustrated in FIG. 2 and includes two motors M1 and M2 having field coils FC1 and FC2 and armatures A1 and A2, respectively. The motors are of a type such that residual magnetism in the field will induce a voltage from approximately 10 mv to 10 v in the armature when rotated by external force. Selection of suitable motors may be accomplished by simply testing standard production motors to determine which of them are inherently capable of producing the required volage output. The motors M1 and M2 are powered by the batteries B1 and B2 which may be of any suitable voltage. They may also be made up of combinations of six or twelve volt batteries.

Switches MS1, MS2, MS3 and MS4 generally control the speed and the forward and reverse direction of the vehicle. The switch MS1 may be used to directly or indirectly control the forward rotation of the motors M1 and M2 and may be attached to a foot control. The single-pole-double-throw (SPDT) switch MS2 has a common pole PA, a pole allowing selection of PB for either slow speed or high speed motion in the forward direction and a pole for reverse motion PC at slow speed only. Switch MS2 controls reverse rotation of the motors M1 and M2 and may appear on the vehicle in the foot control mechanism. When MS2 is closed from pole PA to PC, hereinafter referred to as the "second position", the reverse rotation of the motors is facilitated. The functon of MS2 when closed from pole PA to PB, hereinafter referred to as the "first position", will be hereinafter set forth in detail. Manual switch MS3 when operated together with either MS1 or MS2 (second position), increases the speed of the motors by shunting the current limiting resistor R4 thus creating second speed. Manual switch MS4, when closed with switch MS3 and either MS1 or MS2 (second position) further increases the speed of the motors. The second speed produced by closing MS3 thereby provides a third speed. MS4 functions by shunting all current limiting resistors which are in series with the motors M1 and M2. The circuit including MS4 also contains a time delay device TD whose purpose is to retain the vehicle in the second speed for a certain time period to permit the vehicle to obtain at least a certain velocity. Switches MS1, MS3 and MS4 may be arranged on an accelerator pedal such that further depression of the pedal successively closed switches MS1, MS3 and MS4. Thus, if the pedal is fully depressed, all three switches are closed. Operation of the pedal in the other direction successively closes switches MS2, MS3 and MS4. Thus, if the pedal is fully depressed in this direction, all three switches are closed.

Switches MS5, MS6, MS7 and MS8 function generally as control circuit power supply switches. MS5 is a key-operated switch used to prevent unauthorized use of the vehicle by cutting off the control circuit power until the proper key is inserted and the switch is operated. Switch MS6 is attached to the vehicle's parking brake such that it will interrupt the control circuit power until the parking brake is released. MS7 is a seat switch functioning as a dead-man control cutting off control circuit power if the operator is not on the driver's seat.

MS8 is a momentary normally open push button type switch used as the last switch to be operated to start the vehicle. When MS8 is pushed and MS5, MS6 and MS7 are also closed, the control circuit power will be connected to the other speed control switches. MS8 need not be held depressed as a "holding" relay arrangement holds the power to the control circuit complete even after MS8 returns to its normally open position.

The circuit contains a plurality of relays, each having relay coils designated generally with the letter "L" and the corresponding relay contacts generally designated by the letter "K". Relay coils L1 through L11 should be chosen such that they are compatible with the voltage selected for the battery B1. Relay coil L11 and its relay contact K11 function in a holding fashion so that when the momentary switch MS8 is released, power continues to be supplied to the circuit due to the shunting action of K11 across MS8.

The switch MS9 functions to energize circuitry which changes motors M1 and M2 from series connection to parallel connection providing a second range of speeds. MS9 thereby permits the operation of the vehicle in 3 additional speeds, permitting a total of six forward speeds. This second range of speeds is not available in reverse, i.e. when such switch MS2 is in the second position, and thus reverse travel is limited to only the first range of three speeds.

Switch MS10 when operated, returns the vehicle to the first speed range of operation to reduce the speed of the vehicle so that the scrubbing brushes 12 may concentrate on a particularly dirty area. Switch MS9 energizes relay coil L7 which in turn operates relay contacts K7b, K7c and K7d to change the wiring of motors M1 and M2 from series to parallel and parallel to series, while K7a functions as a holding contact to hold relay coil L7 energized after switch MS9 is released and permitted to open.

Relay coil L8 operates contact K8 to shunt part of resistor R5 which is in series with the motors M1 and M2. This increases substantially the current available to the motors. For the brief moment after MS9 is closed, current will flow through the entire length of resistor R5 due to the time required for physical closing of relay contact K8. Then, when the shunting relay contact K8 finally closes, current is increased to the motors. The impact on the motors will be somewhat lessened with this two-stage application of current.

Relay coil L9 operates relay contact K9a which shunts series current limiting resistor R4. Relay coil L10 operates relay contact K10, which shunts both current limiting resistors R4 and R5, giving motors M1 and M2 the full current available from the batteries.

The time delay device TD may provide from a fraction of a second to a few seconds delay to permit the vehicle to attain a certain speed where the operator attempts to accelerate from the first or second speed into the third speed. The time delay operates in both first and second speed ranges as well as both forward and reverse directions. The time delay may be deleted from the second range if desired.

Fuses F1 and F2 are for the protection of the motors M1 and M2 respectively, and should be chosen with the current requirements of the motors in mind. Fuse F3 is for protection against shorts across the batteries and limiting the permissible load of the system. Fuse F4 is for protection of the control circuitry.

Relay coil L1 and one of its contacts K1a function to operate relay coil L3 and its contacts K3a and K3b. K3b prevents the operation of the motor reversing circuit through switch MS2, when the vehicle is rolling in a forward direction. Relay coil L2 and two of its contacts K2a and K2b function to permit the flow of current through the motor M1 causing it to drive the vehicle in a forward direction as hereinafter described. The two other contacts of relay coil L1, namely K1b and K1c function to permit the flow of current through the other motor M2, also causing it to drive the vehicle in a forward direction. Relay coil L5 and two of its contacts K5a and K5b function to reverse the current provided to motor M1 so as to cause the vehicle to move in a reverse direction. Similarly, relay coil L6 and two of its contacts K6b and K6c function to reverse the current flow provided to motor M2 so as to cause the vehicle to move in a reverse direction.

Contact K1b functions to prevent the operation of motors M1 and M2 in a reverse direction while the vehicle is coasting in a forward direction, thus "locking out" the reverse mode. Similarly, contact K4b functions to prevent the operation of the motors M1 and M2 in a forward direction while the vehicle is coasting in a reverse direction providing the "lock-out" function to the forward mode.

Transistor Q1 is an NPN transistor used for switching. A PNP transistor or other solid state device could also be employed if appropriate polarity changes are made. It should be selected such that it is capable of carrying a current from collector to emitter at least as large as the current drawn by relay coil L3 or L4. Transistor Q1 is used to sense the voltage generated by motor M1 when the vehicle is coasting and thereby control relay coils L3 and L4. Voltage is generated by the motor M1 even through the field coils have no voltage applied because residual magnetism in the field coil FC1 and surrounding material is sufficient to induce a current in the armature A1. Relay coils L3 and L4, as mentioned earlier, provide this lock out function.

Diodes D1 and D2 located across relay coils L3 and L4 respectively function as clamping diodes preventing damaging voltage spikes on the transistor Q1 which may occur when the field of relay coils L3 and L4 collapse.

resistors R1 and R2 provide bias for transistor Q1. Selection of resistors R1 and R2 depends upon the battery voltage B1 and at what point the switching function of Q1 is desired. The choice of values can be determined by a person skilled in the art. Though other values may produce an operating device, the choice of $R1 = 20,000$ ohms, $R2 = 250$ ohms, $R3 = 800$ ohms, transistor Q1 type 2N3055 and diodes D1 and D2 type 3AF2 are considered satisfactory when batteries B1 and B2 are 36 volts each. The series current limiting resistors R4 and R5 may be chosen according to the amount of speed reduction desired and the motors used. The choice of $R4 = 0.34$ ohm and $R5 = 0.50$ ohm with an adjustable tap is considered satisfactory for use with the components in this example.

A time delay device TD is employed in the circuitry to delay the actuation of the highest speed as will be hereinafter described. Device TD may consist of an electronic of electromechanical time measuring device which completes an external circuit connection when the specified time period has elapsed. A commercially available time delay manufactured by Essex International of Logansport, Indiana model no. 133-343003-11 is satisfactory for this purpose.

Circuit Layout

The circuit in FIG. 2 includes a battery B1 with a bus line 101 connected to its negative terminal and a conductor 135 connected to its positive terminal. Conductor 135 is connected to conductor 134 and through fuse F4 to conductor 136. Conductor 134 is connected to the negative terminal of battery B2 and the positive terminal of that battery is connected through fuse F3 to conductor 133. Conductor 136 is connected to one side of switch MS5 and bus line 100. The other side of MS5 is connected to one side of switch MS6, through conductor 137. The other side of MS6 is connected to MS7 through conductor 138. The other side of switch MS7 is connected to switch MS8 through conductor 139. Conductor 139 is also connected to conductor 140. The other side of switch MS8 is connected to conductor 141. Relay coil L11 is connected to conductor 141 and bus line 101. Normally open relay contact K11 is connected between conductors 140 and 141. Conductor 141 is connected to bus conductor 100A. Included on bus line 100 is terminal point X. Included on bus line 101 is terminal point Y.

Bus line 100A is tapped by conductor 102 which is connected to one terminal of switch MS1. The other terminal of switch MS1 is connected to the parallel combination of relay coils L1 and L2 by conductor 103. The other ends of the parallel combination L1 and L2 are connected to the normally closed relay contact K4b by conductor 104. the other side of relay contact K4b is connected through conductor 105 to the bus line 101. The bus line 100A is also tapped by conductor 106, which is connected with the common pole PA of the single-pole double-throw (SPDT) switch MS2. The position of MS2 designated the "second position" connects pole PA with pole PC which in turn is connected to conductor 107. Conductor 107 is connected to the parallel combination of relay coils L5 and L6. The other ends of L5 and L6 are connected in parallel to the normally-closed relay contact K3b by conductor 108. The other side of contact K3b is connected through conductor 109 to the bus line 101. In the position of switch MS2 designated the "first position" pole PB is connected to conductor 145 which in turn is connected to one side of switch MS10. The other side of switch MS10 is connected to the parallel combination of switch MS9 and normally-open relay contact K7a through conductor 146. The other sides of the parallel combination MS9 and K7a are connected together by conductor 148 and to the parallel combination of relay coils L7 and L8. The other side of L7 and L8 are in turn connected to the bus line 101. Bus line 100A is also tapped by conductor 149 which is connected to switch MS3. The other side of MS3 is connected to the parallel combination of normally-open relay contacts K5c and K2c by conductor 150. The other side of K5c and K2c are connected to conductor 151. Conductor 151 is connected to relay coil L9 which in turn is connected to the bus line 101.

Bus line 100A is tapped by conductor 152 which is connected to one side of switch MS4. The other side of switch MS4 is connected to normally open relay contact K9b by conductor 152. The other side of contact K9b is connected to the time delay device TD through conductor 154. The other side of TD is connected to relay coil L10 through conductor 155. The other side of L10 is then connected to the bus line 101.

The bus line 100 is tapped by conductor 110, which is connected to resistor R1. The other side of resistor R1 is connected to resistor R2 and the base of NPN transistor Q1. The other side of resistor R2 is connected to parallel combination of resistor R3 and normally-closed relay contact K7e. The other sides of R3 and K7e are connected in parallel to conductor 111. Conductor 111 is connected to conductor 112 and the parallel combination of normally closed relay contacts K2a and K5a. The other side of K2a is connected to one end of field coil FC1 and one end of the normally-open relay contact K2b. The other end of K5a is connected to the other end of field coil FC1 and one end of the normally-open relay contact K5b. The other ends of K2b and K5b are connected in parallel to conductor 123. One end of the armature A1 is connected to conductor 112, and the other is connected to conductor 113 which is in turn connected to the bus line 101. The armature A1 is also mechanically connected to the drive shaft 114 and in turn to the drive wheel 115. One end of fuse F1 is connected to conductor 123 and the other end of F1 is connected to one end of the normally-open relay contact K7b and the normally-closed relay contact K7c. The other side of contact K7c is connected to one side of armature A2 and normally-open relay contact K7d. The other side of contact K7d is connected by conductor 124 to the bus line 101. The other side of armature A2 is connected to the parallel combination of normally closed relay contacts K1c and 6c. Contact K1c is connected to one end of field coil FC2 and normally-open relay contact K1b. The other end of contact K6c is connected to the other side of field coil FC2 and one side of the normally-open relay contact K6b. The other ends of contacts K1b and K6b are connected together and in turn to fuse F2. The other side of fuse F2 is connected to conductor 126 which is in turn connected to conductors 127, 128 and resistor R5. Conductor 127 is then connected to the other side of the normally-open relay contact K7b. Conductor 128 is connected to normally-open relay contacts K8 and K10. Contact K8 is connected via conductor 130 to an adjustable tap on resistor R5. Contact K10 is then connected to bus line 133. The other side of resistor R5 is connected to the parallel combination of resistor R4 and normally-open relay contact K9a. The other side of K9a and R4 are connected to the bus line 133.

Bus line 100 is tapped by conductor 116, which in turn is connected to the parallel combination of normally-open relay contacts K1a and K3a. The other side of the parallel combination K1a and K3a is connected in parallel to conductor 117. Conductor 117 is then connected to the parallel combination of relay coil L3 and the cathode side of diode D1. The other end of coil L3 and the anode side of D1 are connected in parallel to conductors 118 and 119. Conductor 119 is attached to the parallel combination of relay coil L4 and the anode side of diode D2. The other sides of the combination L4 and D2 are connected in parallel to conductor 120 which in turn is connected to the parallel combination of normally-open relay contacts K6a and K4a. The other side of the parallel combination K6a and K4a is connected in parallel to conductor 121, which in turn is connected to the bus line 100.

Conductor 118 is connected to the collector of transistor Q1. The emitter of transistor Q1 is connected to the bus line 101 by conductor 122.

Operation of the Invention

The improved control circuitry may be used in conjunction with a variety of vehicles such as floor maintenance equipment including walk-behind or riding-type floor scrubbers or sweepers. A typical riding type vehicle 10 as is shown in FIG. 1. Foot control 15 in this embodiment may include a speed and direction control pedal which, when moved forward, would successively operate switches MS1, MS3 and MS4. Thus when the control is moved to its forwardmost position, all three switches will be closed. When the control 15 is moved backward from a center or neutral position, it will successively close switches MS2 (second position) MS3 and MS4. Thus when the control is in its backmost position, all three switches will be closed. With the control moved forward, the vehicle will move in a forward direction, its speed depending on how far forward the control was moved, and similarly moving the control backward will move the vehicle in a reverse direction. The operator's control panel may also include push button switches corresponding to MS9 and MS10 where MS9 could be labeled "High Speed Range-Forward" and MS10 labeled "Scrub Speed Switch". The function of MS9 is to provide a second range of 3 speeds in the forward direction only. The purpose of MS10 is to momentarily interrupt the function of MS9, thus bringing the vehicle down to its lower range of forward speeds to enable the scrubbing brush 12 to concentrate on a particularly dirty area.

Commencing with the vehicle from a relaxed, nonmoving state, the operator can initiate forward movement by closing the key switch MS5, releasing the parking brake thus closing MS6, sitting down on the operator's seat which closes the dead-man control switch MS7, and actuating the start switch MS8. This will permit current to flow from battery B1 through conductors 135, 136 through switches MS5, MS6, MS7 and MS8 and conductor 141 into relay coil L11 and returning to the battery through bus conductor 101. When L11 is thus energized, holding contact K11 will close, eliminating the need for further depression of the momentary switch MS8. This starting procedure will now connect bus line 100A with the positive terminal of battery B1. Opening any one of switches MS5, MS6, or MS7 will disconnect bus line 100A from battery B1 which in turn de-energizes all of the control devices connected to bus line 100A. To move the vehicle forward, the operator will close switch MS1 by moving control 15 forward. Current may now flow from bus line 100A through MS1 energizing relay coils L1 and L2, and across the normally closed contact K4b, to the negative bus line 101. With L1 and L2 energized, the corresponding relay contacts K1c and K2a will now open and K1b and K2b will now close. This will complete the circuit including bus line 101, conductor 113, armature A1, conductor 112, relay contact K5a which is normally closed, field coil FC1, relay contact K2b, conductor 123, fuse F1, relay contact K7c which is normally closed, armature A2, relay contact K6c which is normally closed, field coil FC2, relay contact K1b which is now closed, fuse F2, conductor 126, resistors R5 and R4, bus conductor 133, and back to the batteries B2 and B1. Notice that motors M1 and M2 are connected in series.

When the operator wishes to increase the forward speed he may close MS3 along with MS1. Current may now flow from bus line 100A through MS3 across relay contact K2c, which closed when relay coil L2 was energized, into conductor 151 and energizing relay coil L9. With L9 energized, relay contact K9b will now be closed. The purpose of relay contacts K2c and K5c which are in parallel is to provide an added safety device to prevent the operation of switch MS3 before either MS2 or MS1 has been closed. Likewise, the purpose of relay contact K9b is to prevent the operation of MS4 before MS3 has been closed. When L9 has been energized, relay contact K9a is also closed. This provides a shunt across the current limiting resistor R4, thus permitting greater current to flow to the motors M1 and M2 increasing their speed.

To increase the forward speeds still further, MS4 is closed, completing a circuit from bus conductor 100A across MS4 through relay contact K9b, now closed, through the time delay device TD and energizing relay coil L10. The time delay device TD will prevent the immediate energizing of L10 when switch MS4 is closed. This will prevent a "jack-rabbit" start caused when the operator attempts to start the vehicle in high speed from a dead-stop. With relay coil L10 closed, relay contacts K10 now closes shunting both current limiting resistors R4 and R5 providing the motors with still greater current.

Should the operator require more power or speed in a forward direction, he may at any time close the second speed range switch MS9. This will complete the circuit from bus line 100A through conductor 106 to the common pole PA to pole PB of switch MS2 (first position) and into conductor 145, through MS10, through MS9 and energizing the parallel combination of the relay coils L7 and L8. Energizing L8 closes relay contact K8 which bypasses part of current limiting resistor R5. This will have the effect of increasing the current flow to the motors, thus increasing their speed. When L7 is energized, holding contact K7a closes, creating a shunt across switch MS9, thus eliminating the need for continuous pressure on this momentary type push-button switch. At the same time, contacts K7b and K7d close while K7c opens. This changes the interconnection of motors M1 and M2 from series to parallel. The current flows from bus conductor 133 through R4 into R5, part of which is shunted by K8, into conductor 127 through contact K7b through fuse F1 into conductor 123, through contact K2b which is now closed, through field coil FC1, through contact K5a which is still closed, into conductor 112, through armature A1 into conductor 113 and back to the series connection of batteries B1 and B2 via line 101. Thus, motor M1 is energized by the full series voltage of B1 and B2. Similarly, current flows from bus conductor 133 through resistors R4 and R5, which is partially shunted by contact K8 into conductor 126 through fuse F2 through relay contact K1b which is now closed, through field coil FC2, through relay contact K6c which is still closed, into armature A2 through relay contact K7d which is now closed, into conductor 124 and back to the series combination of batteries B1 and B2 through bus line 101. Thus, motor M2 is also energized by the full series voltage of the batteries B1 and B2.

Starting from a relaxed non-moving state, the reverse motion of the vehicle is initiated by moving MS2 to its second position which completes the circuit from pole PA to PC (i.e. second position) in switch MS2. This will complete the circuit energizing relay coils L5 and L6 when normally-closed contact K3b is closed. The effect of this is to direct the current through FC1 and FC2 in a direction opposite of that which was used when the vehicle was going in a forward direction. Polarity reversal on the field coils while not changing armature polarities, will cause armatures A1 and A2 to rotate in a reverse direction. Current reversal is accomplished by the opening of contacts K6c and K5a and the closing of contacts K6b and K5b. Looking at motor M1, it can be seen that current flows through contact K5b up through field coil FC1 and across contact K2a, which is the opposite of the condition found when the vehicle is operated in a forward mode. The same reversal occurs in field coil FC2 for motor M2.

Successively increasing speeds in reverse is possible by moving switch MS2 to the second position and then closing MS3 and then finally closing MS4 so that the highest reversed speed is obtained when all three switches are closed. Notice that the second speed range is shown as not being available in the reverse mode. This is because the high speed forward switch MS9 is disconnected when MS2 is in the second position.

If the operator decides to reverse the direction of the vehicle while it is still coasting in one direction, circuitry is provided to prevent jolting caused by sudden reversal of the motors. This circuitry prevents the energizing of the motors in opposite direction until such time as the speed of the vehicle has slowed to a predetermined level, usually a near stop condition. This is accomplished by detecting the small voltage generated in motor M1 when the vehicle is coasting and thus turning the armature of M1. This small voltage is applied to a transistor which operates further circuitry which disables the operation of the switches which would allow the vehicle to be operated in the opposite direction. This circuitry operates from either forward to reverse or reverse to forward conditions.

Starting from a relaxed, non-moving state, the forward motion of the vehicle is started by closing switch MS1 which energizes motors M1 and M2 and relay coils L1 and L2. When relay coil L1 is energized, its corresponding normally-open relay contact K1a closes. Current flowing through the field coil FC1 also goes into conductor 111 through resistor R3 through resistor R2 and into the base of transistor Q1. Simultaneously, current enters conductor 110 from bus line 100 and goes through resistor R1 to the base of transistor Q1. The current entering the base of Q1 through resistors R1 and R2 is sufficient to cause transistor Q1 to conductor from collector to emitter. Additionally, current from bus line 100 enters conductor 116 and goes through relay contact K1a which is now closed, then travels into conductor 117 to relay coil L3. From there, current travels into conductor 118 to the collector of transistor Q1. The current entering the collector of transistor Q1 leaves the emitter via conductor 122 since Q1 is now conducting, and returns to battery B1 by bus line 101. With relay coil L3 now energized, relay contact K3a will close creating a holding arrangement permitting the flow of current from conductor 116 to 117, regardless of the state of contact K1a. This means that even though switch MS1 may now be opened, the circuit from conductor 116 to 117 remains closed. Likewise, the energizing of relay coil L3 opens the normally closed relay contact K3b. The opening of K3b will make it impossible to complete this circuit containing switch MS2 (second position) and drive the vehicle in reverse. Thus, it is impossible to operate the vehicle in reverse at this time.

While the vehicle is still rolling forward, the operator may attempt to reverse the direction of the vehicle. This may be accomplished by opening switch MS1 and closing MS2 (second position). In order to prevent the jolting action and associated damage to the motors caused by a sudden reversal of direction, the invention prevents the motor from being energized in the reverse direction until such time as the vehicle has slowed down to a near stop. Even though MS1 is now open, the circuit containing relay coil L3 remains completed so long as transistor Q1 continues to be in a conduction state from collector to emitter. This assures the continuance of the "lock-out" function of relay contacts K3b by blocking the operation of the reverse circuit containing MS2 (second position). Relay contact K3b remains open only so long as transistor Q1 is conducting.

While the vehicle is coasting in a forward direction, armature A1 rotates even though it is not energized because of its mechanical connection to the wheel 115 through the drive shaft 114. Due to residual magnetism in the field coil FC1, a small amount of voltage is generated in the armature A1 of the electric motor M1. As the speed of the vehicle diminishes, the amount of current to the base of transistor Q1 also diminishes because current will now have an increasing tendency to reverse its direction through resistor R2 when armature A1 begins to act as a current sink instead of a current source. As the vehicle approaches a near stop, the voltage generated by armature coil A1 will approach zero and most of the current flowing through R1 will be siphoned off by the current sink armature A1, leaving insufficient current to the base of Q1 to continue conduction from collector to emitter. The point of non-conduction is adjustable by changing the characteristics or biasing of transistor Q1 so that this near-stop speed may actually be any desired speed less than the maximum vehicle speed. When transistor Q1 ceases to conduct, relay coil L3 will no longer be energized. This will now allow the normally closed contact K3b to close again.

With relay contact K3b now closed, current will flow from battery B1 through bus line 100A and conductor 106, then through pole PA and PC of switch MS2 (second position) into the parallel combination of relay coils L5 and L6, through the closed relay contact K3b and back to battery B1 through bus line 101.

With MS2 operated for reversal of the motors, current will now flow in a reverse direction through field coils FC1 and FC2 as mentioned earlier. While the motors are energized, current will again flow into conductor 111 from field coil FC1 through contact K2a and in turn through resistors R3 and R2 into the base of transistor Q1. With the current coming through R2 and the current coming through R1 from bus line 100 and conductor 110, transistor Q1 will be biased so that it is conducting from collector to emitter again. Simultaneously, current flows from the bus line 100 into conductor 121 and into the parallel combination of relay contacts K6a and K4a and from there into relay coil L4. From L4, current travels through conductor 119 and 118 through the transistor from collector to emitter and to the bus line 101. Because relay coil L4 is now energized, contact K4a closes to hold L4 energized, permitting the current to flow through the above-described branch circuit involving relay coil L4, regardless of whether relay contact K6a is open or closed. With relay coil L4 energized, relay contact K4b now opens thereby locking out the operation of the forward circuit including switch MS1. The lockout condition continues so long as transistor Q1 is conducting collector to base, and this occurs as it did in the forward mode so long as armature A1 is generating sufficient current to bias Q1. At a near stop condition, transistor Q1 no longer conducts and contact K4b returns to its normally closed position since L4 is no longer energized.

SECOND PREFERRED EMBODIMENT

Figure 3:
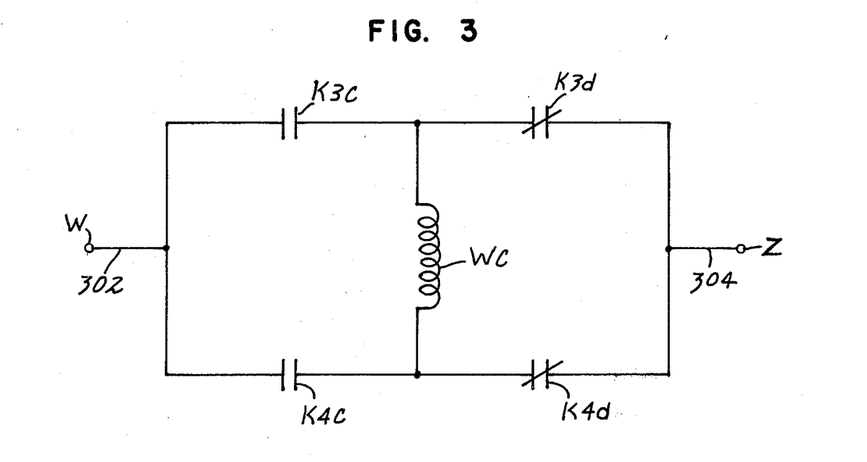
FIG. 3 is a schematic circuit of additional circuitry suitable for use in conjunction with the circuit of FIG. 1 to provide a second preferred embodiment of the invention utilizing a separate field coil in the motor for generating a detectable voltage and current.

A second preferred embodiment of this invention is made up of the identical circuitry of FIG. 2 with the addition of the circuitry shown in FIG. 3 where terminal point W in FIG. 3 is attached to terminal point X in FIG. 2 and where terminal point Z in FIG. 3 is attached to terminal point Y in FIG. 2. The second preferred embodiment may therefore include every element of the circuit in FIG. 2 plus the elements of the circuit in FIG. 3.

This second preferred embodiment contains a winding WC which consists of an extra stationary winding inside motor M1 which when energized with an electric current will create a magnetic field thereby generating a voltage in the armature A1 when the vehicle is coasting i.e. with no voltage applied to the armature A1. Winding WC provides a magnetic field required to produce the generating effect in motor M1 when the vehicle is coasting eliminating the need for a motor with a field core having residual magnetism. The particular configuration of motor M1 is not therefore critical. The number of windings and type of wire used for winding WC can be found by determining the amount of voltage desired to be produced in armature A1. The particular voltage of battery B1 which is applied to winding WC will of course effect the voltage output in armature A1. The precise specifications of winding WC are not critical. It is only important that the voltage induced in the armature be sufficient to operate transistor Q1. A person skilled in the art could vary the bias of Q1, size and number of windings in WC or the amount of voltage applied to WC to achieve the desired output in the armature.

FIG. 3 also includes normally open relay contact K3c and normally closed relay contact K3d both of which are operated by the relay coil L3 in FIG. 2. Also shown in FIG. 3 is normally open relay coil contact K4c and normally closed relay contact K4d both of which are operated by relay coil L4 found in FIG. 2.

The circuitry in FIG. 3 contains the parallel combination of normally-open relay contacts K3c and K4c which are at one end connected to conductor 302 and in turn to terminal point W. The other end of contact K3c is connected to one end of winding WC and the normally-closed relay contact K3d. The other end of relay contact K4c is connected to the other end of winding WC and normally closed relay contact K4d. The other ends of K3d and K4d are both connected to conductor 304 and in turn to terminal point Z.

The operation of the circuitry of this second preferred embodiment is as follows: The combination of circuitry in FIG. 2 and FIG. 3 operates identically to that explained in the first embodiment with the addition of a current which flows from bus line 100 to terminal point X and in turn into terminal point W into conductor 302 as shown in FIG. 3. Now when L3 is energized, contact K3c will be closed permitting current to flow through K3c into winding WC across the already closed relay contact K4d into conductor 304 to terminal W and into terminal Y on FIG. 2.

When relay coil L4 is energized, indicating motion in a reverse direction, current travels from terminal point X into terminal point W and then in turn into conductor 302 across the now closed relay contact K4c up through winding WC, through K3d which is already closed, into conductor 304, to terminal point Z and in turn into terminal point Y on FIG. 2. Thus, because of the reversal in current in winding WC, the current generated in armature A1 will have the same polarity regardless of whether the vehicle is rolling forward or backward.

THIRD PREFERRED EMBODIMENT

Figure 4:
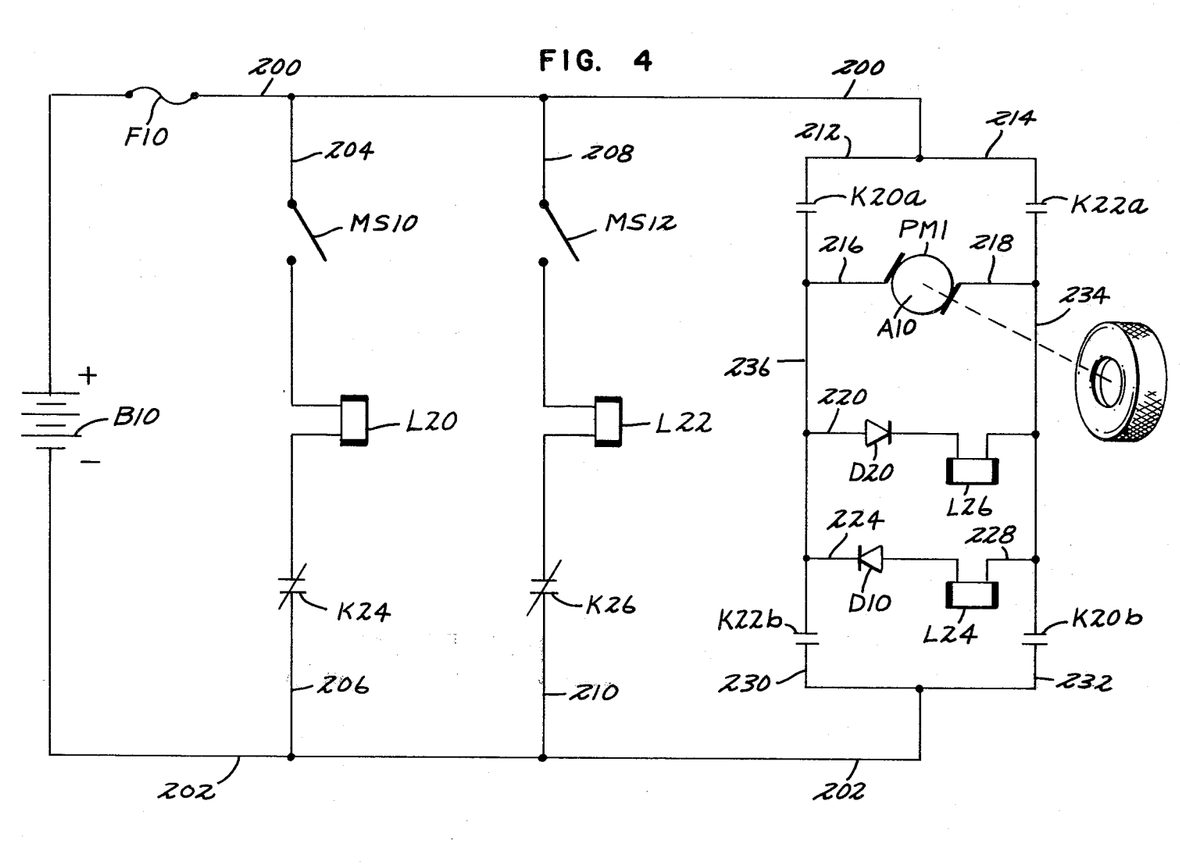
FIG. 4 is a schematic circuit of a third preferred embodiment illustrating an alternative lock-out circuit using a permanent magnet motor.

The "lockout" function of this invention may also be accomplished with the use of permanent magnet motors in place of motors with wire-wound field coils as described above. Because a permanent magnet motor will inherently generate a substantial electric current when its aramature is rotated while the vehicle is coasting, it is unnecessary to provide transistor amplification of the current generated to operate relays which in turn perform the lockout function. FIG. 4 is a schematic drawing of circuitry of this third preferred embodiment. Note that this schematic illustrates only the circuitry necessary for the lockout function with permanent magnet drive motors. The additional circuitry found in the other preferred embodiment for controlling the various speeds of the device, may easily be added to this basic circuitry by one skilled in the art. The speed control circuitry has been left out in order to more clearly identify the relevant changes in this third preferred embodiment.

In brief, the lockout circuitry in FIG. 4 functions much the same as that in the embodiment aforedescribed. In this embodiment, however, the use of a permanent magnet motor generates so much current when the vehicle is coasting that this current is sufficient to energize relays which function to lock out the operation of a reversing current, i.e. either forward or backward, depending on which way the vehicle is coasting.

Looking to FIG. 4, in operation, the vehicle's forward travel is initiated by closing manual switch MS11 which permits current to flow from the battery B10 through fuse F10 into bus line 200, into conductor 304, across to switch MS11 through relay coil L20 across normally closed relay contact K24 into conductor 206 and back to battery B10 through bus line 302. With relay coil L20 energized, current now flows from bus line 200 into conductor 212 across normally open relay contact K20a into conductor 216 into permanent magnet motor PM1 into conductor 218 through conductor 234, across normally open relay contact K20b, which is now closed, into conductor 232 and returning to the battery through bus line 302. Current will also flow into conductor 236, to conductor 220 across diode D20 through relay coil L26 into conductor 234 through relay contact K20b and back to the battery through bus line 302. With relay coil L26 energized, normally closed relay contact K26 now opens, preventing the operation of the motor in a reversed direction which would be initiated by closing switch MS12.

If MS11, the forward switch, is now opened and MS12 is closed, the reverse switch, the vehicle will continue to roll forward since the lock-out circuitry will prevent the operation of the circuit for reversing the vehicle. So long as relay coil L26 is energized, relay contact K26 remains open and closing switch MS12 is ineffectual. Although no current is flowing in the bus lines, armature A10 of permanent magnet motor PM1 is still turning, thereby generating a current flowing from conductor 216 into conductors 236 and 220 through diode D20 across relay coil L26 into conductor 234 and back to the motor via conductor 218, thereby keeping L26 energized until armature A10 comes to a near stop. When this occurs, motor PM1 will no longer generate sufficient current to keep L26 energized and relay contact K26 will return to its normally closed state. This will now permit the reverse switch MS12 to complete a circuit which will energize motor PM1 in the opposite direction and energize coil L24 which will in turn open the normally-closed contact K24. With K24 now open, the forward circuit including MS11 will be locked out. Again, when the vehicle is coasting in a reverse direction, the current generated in motor PM1 will be sufficient to energize the appropriate relay coil, in this case L24, through diode D10. When the vehicle finally comes to a near stop, relay coil L24 will be deenergized and the forward circuit will then no longer be locked-out.

What we claim is:

1. A floor maintenance vehicle comprising in combination a body, a plurality of wheels for supporting said body, means for steering said vehicle, means for maintaining floor surfaces, a plurality of reversible electric drive motors, each of said motors having a field coil and an armature coil, said motors being adapted for driving said wheels, a power source, means for selectively changing the electrical connection between said plurality of motors from series to parallel and parallel to series, reversing means for reversing the flow of current through each of said field coils while leaving unchanged the flow of current through the corresponding armatures to reverse the direction of said motors, means for preventing reversing direction of said drive motors until said vehicle has slowed to a predetermined speed; said preventing means including a circuit for sensing the rotation of said motors in a coasting state wherein said motors are rotating without voltage applied to said field coil and for preventing the application of voltage to said field coils which would reverse the direction of said motors until said motors have slowed to a predetermined rotational velocity, said circuit including; voltage detecting means powered by said power source, said detecting means including means for amplifying a detected voltage, said detecting means being connected in parallel with said armature coils and having one pole of said armature coils and one side of said detecting means at the same electrical potential at all times for detecting voltage generated therein when said motor is in said coasting state and amplifying said voltage, and preventing means responsive to said detecting means for preventing application of said reversing voltage to said motor while said detecting means is sensing said generated voltage.

2. The apparatus of claim 1 wherein said motors comprise a first and second motor, said changing means includes first, second and third electric relay contacts where said first relay contact is of a normally closed type and where said second and third relay contacts are of a normally open type, and one side of said first motor being connected to the one side of said power source and one side of said second motor being connected to the other side of said power source, the other side of said first motor being connected to one side of said first relay contact and one side of said second relay contact, the other side of said second relay contact being connected to the other side of said power source, the other side of said second motor being connected to the other side of said first relay contact and one side of said third relay contact and the other side of said third relay contact is connected to said one side of said power source.

3. A floor maintenance vehicle comprising, in combination, a body, a plurality of wheels for supporting said body, means for steering said vehicle, means for maintaining floor surfaces, a plurality of reversible electric drive motors for driving said wheels, said motors each having an armature and a field coil, a power source for supplying current to said motors, means for controlling the current applied to said motors providing increasing and decreasing stepwise increments, means for switching said controlling means from one current increment to the next; said controlling means including means for providing resistance and means for shunting said resistance means, said resistance means being in series with said motors and means for selectively changing the electrical connection of said motors with each other from series to parallel and from parallel to series, means for delaying application of said current increment until said vehicle has attained acceleration in forward velocity, and means for preventing reversing direction of said motors until said vehicle has slowed to a predetermined speed, circuit means for reversing the flow of current through said field coils to reverse the direction of the motors, and a circuit for sensing the rotation of at least one of said motors in a coasting state wherein said at least one motor is rotating without voltage applied to said field coil and means for preventing the application of voltage to said field coils which would reverse the direction of said motors until said at least one motor has slowed to a predetermined rotational velocity, said circuit including; detecting means connected in parallel with the armature coil of said at least one motor with one side of said armature coil and one pole of said detecting means being at ground potential for detecting voltage generated therein when said at least one motor is in said coasting state, and preventing means responsive to said detecting means for preventing application of said reversing voltage to said motors while said detecting means is sensing said generated voltage.

4. The apparatus of claim 3 wherein said shunting means includes relay contacts placed across said resistance means and wherein said changing means includes further relay contacts.

5. The apparatus of claim 3 wherein said shunting means includes relay contacts placed across said resistance means and wherein said changing means includes a first, second and third electric relay contacts where said first relay contact is of a normally closed type and where said second and third relay contacts are of a normally open type, and one side of said first motor being connected to the one side of said power source and one side of said second motor being connected to the other side of said power source, the other side of said first motor being connected to one side of said first relay contact and one side of said second relay contact, the other side of said second relay contact being connected to the other side of said power source, the other side of said second motor being connected to the other side of said first relay contact and one side of said third relay contact and the other side of said third relay contact is connected to said one side of said power source.

6. A floor maintenance vehicle comprising, in combination, a body, a plurality of wheels for supporting said body, means for steering said vehicle, means for maintaining floor surfaces, a plurality of electric drive motors for driving said wheels, said motors having field and armature coils with one side of said armature coils at ground potential, a power source for supplying current to said motors, means for controlling the current applied to said motors, said controlling means being adapted to provide stepwise increasing and decreasing increments, means for switching said controlling means from one current increment to the next, means for delaying application of said next current increment until said vehicle has had some time to accelerate, means for selectively changing the electrical connection between said motors from series to parallel and from parallel to series, means for reversing the flow of current through said field coils for reversing the rotation of said motors; and a control circuit for sensing rotation of at least one of said motors, said control circuit serving to prevent application of electrical power to said motors until said at least one motor has slowed to a predetermined rotational velocity, said control circuit including a transistor having a base and an emitter, said base being connected to the ungrounded side of said armature coil and said emitter being at ground potential.

7. An electrically driven riding vehicle comprising a vehicle body being supported on a plurality of wheels, an electrically reversible DC motor having field and armature coils, at least one of said wheels being driven by said motor, means for reversing the flow of current through said field coil to reverse the direction of the motor, and a control circuit for sensing the rotation of said motor in a coasting state wherein said motor is rotating without voltage applied to said coils and for preventing the application of voltage to said field coil which would reverse the direction of said motor until said motor has slowed to a predetermined rotational velocity, said control circuit including detecting means connected in parallel with said armature coil for detecting voltage generated therein when said motor is in said coasting state, and preventing means responsive to said detecting means for preventing application of said reversing voltage to said motor while said detecting means is sensing said generated voltage.

8. A riding type floor maintenance vehicle comprising a vehicle body including an electric motor, said body being supported on a plurality of wheels, at least one of said wheels being drivenly connected to said electric motor, said motor being electrically reversible, said vehicle including a control circuit for sensing rotation of said driven wheels and means for preventing the application of electrical power to said motor to reverse said motor until said wheels have slowed to a predetermined rotational velocity, said control circuit including a first control circuit for applying current to said motor causing said armature to rotate in a first direction; and a second control circuit for applying current to said motor causing said armature to rotate in a second direction being opposite to said first direction;

said preventing means comprising a first normally closed relay contact in series with said first circuit, and second normally closed relay contact in series with said second circuit; a first holding circuit means controlling said first relay contact, a second holding circuit means controlling said second relay contact; means for detecting said generated voltage; preventing means being responsive to said detecting means for preventing completion of said first circuit when said armature is rotating in said second direction and for preventing completion of said circuit when said armature is rotating in said first direction; said first holding circuit means being responsive to said detecting means for holding said first relay contact in its open-circuit state until said armature has slowed to said predetermined speed when said armature is coating in said first direction; said second holding circuit means being responsive to said detecting means for holding said second relay contact in its open-circuit state until said armature has slowed to said predetermined speed when said armature is coasting in said second direction; and wherein said second holding circuit means includes a first relay coil for controlling said second relay contact; a third relay contact responsive to said first relay coil and being in series with said first relay coil; a fourth relay contact in parallel with said third relay contact; a second relay coil in series with said first control circuit for controlling said fourth relay contact; and wherein said first holding circuit means includes a third relay coil for controlling said first relay contact; a fifth relay contact responsive to said third relay coil in series with said third relay coil; a sixth relay contact in parallel with said first relay contact; and a fourth relay coil in series with said second control circuit for controlling said sixth relay contact.

9. An electrically driven riding vehicle comprising a vehicle body including an electric motor, said body being supported on a plurality of wheels, at least one of said wheels being drivenly connected to said electric motor, said motor being electrically reversible, said vehicle including a control circuit for sensing rotation of said driven wheels and means of preventing the application of electrical power to said motor to reverse said motor until said wheels have slowed to a predetermined rotational velocity, said control circuit including a first control circuit for applying voltage to said motor causing said armature to rotate in a first direction; and a second control circuit for applying voltage to said motor causing said armature to rotate in a second direction, said second direction being opposite to said first direction;

means for detecting said generated voltage;

said preventing means comprising a first normally closed relay contact in series with said first circuit, and a second normally closed relay contact in series with said second circuit; a first holding circuit means controlling said first relay contact, a second holding circuit means controlling said second relay contact;

said preventing means being responsive to said detecting means for preventing completion of said first circuit when said armature is rotating in said second direction and for preventing completion of said second circuit when said armature is rotating in said first direction; said first holding circuit means being responsive to said detecting means for holding said first relay contact in its open-circuit state until said armature has slowed to said predetermined speed when said armature is coasting in said first direction; said second holding circuit means being responsive to said detecting means for holding said second relay contact in its open-circuit state until said armature has slowed to said predetermined speed when said armature is coasting in said second direction; and wherein said second holding circuit means includes a first relay coil for controlling said second relay contact; a third relay contact responsive to said first relay coil and being in series with said first relay coil; a fourth relay contact in parallel with said third relay contact; a second relay coil in series with said first control circuit for controlling said fourth relay contact; and wherein said first holding circuit means includes a third relay coil for controlling said first relay contact; a fifth relay contact responsive to said third relay coil in series with said third relay coil; a sixth relay contact in parallel with fifth relay contact; and a fourth relay coil in series with said second control circuit for controlling said sixth relay contact.

10. An electrically driven riding vehicle comprising a vehicle body including an electrically reversible DC motor having field and armature coils, said body being supported on a plurality of wheels at least one of said wheels being driven by said motor, a control circuit including means for reversing the flow of current through said field coil to reverse the direction of the motor, and a control circuit for sensing the rotation of an electrically reversible motor in a coasting state wherein said motor is rotating without voltage applied to said coils and for preventing the application of voltage to said field coil, which would reverse the direction of said motor until said motor has slowed to a predetermined rotational velocity, said control circuit including;
   (a) detecting means connected in parallel with said armature coil for detecting voltage generated therein when said motor is in said coasting state,
   (b) preventing means responsive to said detecting means for preventing application of said reversing voltage to said motor while said detecting means is sensing said generated voltage.

11. The circuit of claim 10 wherein said motor is capable of sustaining residual magnetism when no current is flowing in said field coil so that a voltage will be induced in said armature coil when rotated.

* * * * *

UNITED STATES PATENT AND TRADEMARK OFFICE
CERTIFICATE OF CORRECTION

PATENT NO. : 4,378,855
DATED : April 5, 1983
INVENTOR(S) : Donald J. Haub et al

It is certified that error appears in the above—identified patent and that said Letters Patent is hereby corrected as shown below:

Column 1, line 36, delete "and the motors", second occurrence.

Column 4, line 54, delete "resistors" and substitute therefor --Resistors--.

Column 5, line 4, delete "of" and insert therefor --or--.

Column 6, line 4, delete "152" and insert therefor --153--.

Column 6, line 37, delete "6c" and insert therefor --K6c--.

Claim 8, line 32 (column 16, line 12) delete "coating" and insert therefor --coasting--.

Claim 8, line 50 (column 16, line 30) delete "first" and insert therefor --fifth--.

Signed and Sealed this

Nineteenth Day of July 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,378,855

DATED : April 5, 1983

INVENTOR(S) : Donald J. Haub, Raymond C. Hawkins & Howard N. Seim

It is certified that error appears in the above-identified patent and that said Letters Patent is hereby corrected as shown below:

Title page, Item (75), delete Neil T. Brown and Keith N. Krier.

Signed and Sealed this

Sixteenth Day of August 1983

[SEAL]

Attest:

Attesting Officer

GERALD J. MOSSINGHOFF

Commissioner of Patents and Trademarks